(12) United States Patent
Mills et al.

(10) Patent No.: US 8,595,613 B1
(45) Date of Patent: Nov. 26, 2013

(54) PAGE ELEMENT IDENTIFIER PRE-CLASSIFICATION FOR USER INTERFACE BEHAVIOR IN A COMMUNICATIONS SYSTEM

(75) Inventors: Raymond L. Mills, Calhan, CO (US); Daniel M. Newman, Littleton, MA (US)

(73) Assignee: Viasat Inc., Carlsbad, CA (US)

( * ) Notice: Subject to any disclaimer, the term of this patent is extended or adjusted under 35 U.S.C. 154(b) by 0 days.

(21) Appl. No.: 13/558,593

(22) Filed: Jul. 26, 2012

(51) Int. Cl.
*G06F 17/00* (2006.01)
*G06F 3/00* (2006.01)

(52) U.S. Cl.
USPC .......................................... 715/234; 715/705

(58) Field of Classification Search
USPC .......................................... 715/200, 234, 705
See application file for complete search history.

(56) References Cited

U.S. PATENT DOCUMENTS

| 6,442,577 | B1 | 8/2002 | Britton |
| 8,000,259 | B2 | 8/2011 | Mills et al. |
| 2002/0133637 | A1* | 9/2002 | Popp et al. ..................... 709/315 |
| 2009/0287772 | A1* | 11/2009 | Stone et al. ..................... 709/203 |
| 2010/0185729 | A1* | 7/2010 | Lord et al. ..................... 709/203 |
| 2010/0192097 | A1* | 7/2010 | Brugler et al. ............... 715/821 |
| 2012/0066583 | A1* | 3/2012 | Priestley et al. .............. 715/234 |

\* cited by examiner

*Primary Examiner* — Doug Hutton, Jr.
*Assistant Examiner* — Andrew McIntosh
(74) *Attorney, Agent, or Firm* — Marsh Fischmann & Breyfogle LLP; Daniel J. Sherwinter

(57) ABSTRACT

Systems and methods are described for modifying user interface behavior according to page element identifier pre-classification. For example, a number of content page (e.g., webpage) element identifiers (e.g., object classes or identifiers) are pre-classified as linking to associated media objects. When a content page or domain is requested by a user's web interface, the response is intercepted and analyzed to see if it has pre-classified element identifiers. If so, a script is injected in the webpage code or otherwise communicated to the requesting web interface, and the script is executed at the client side. Having executed the script, when a user interacts with a page element having one of the pre-classified element identifiers, the user interface is modified to provide enhanced functionality relating to the media object linked to by the page element.

11 Claims, 9 Drawing Sheets

PAGE ELEMENT IDENTIFIER PRE-CLASSIFICATION FOR USER INTERFACE BEHAVIOR IN A COMMUNICATIONS SYSTEM

FIELD

Embodiments relate generally to communications services, and, more particularly, to modifying user interface behavior according to page element identifier pre-classification.

BACKGROUND

Users of communications services are increasingly accessing media content over data communications networks, like the Internet, through content service provider (e.g., media aggregator websites), web portals, games, and/or other user interfaces. The user interfaces can include media objects and elements that link to media content objects. Some media content and/or communications services providers seek to enhance services and user experiences (e.g., to help users find and access desired content, to monitor and understand user selection processes, etc.) through user interfaces that present added functionality upon detecting that a user has interfaced with a media object. For example, a browser can include a plug-in that displays additional information or options to the user (e.g., in a pop-up window) when it detects that a movie file is being downloaded.

Traditional approaches to providing additional information or options to the user in these types of contexts tend to be limited in a number of ways. Some implementations of such functionality operate through a plug-in or desktop (e.g., system tray) type of application, which involve installation by the user, maintenance and support by the operator, support for multiple platforms, etc. to function properly. Other implementations of such functionality involve redirecting the user to a dedicated website that has enhanced page functionality, which typically takes the user away from the preferred content service provider website and/or otherwise impacts the user experience in undesirable ways. Further, the various traditional implementations tend to respond to user interactions with media objects themselves, rather than with page elements that link to those media objects. For example, the enhanced interface is able to "pop-up" information in relation to a media object that is accessed (e.g., when the download is ready to begin), but not in relation to an element (e.g., an image or text link) that links to the media object prior to accessing the object.

BRIEF SUMMARY

Among other things, systems and methods are described for modifying user interface behavior according to page element identifier pre-classification. In one illustrative embodiment, a number of webpage element identifiers are pre-classified as linking to associated media objects. For example, a number of webpages (and/or domains) is analyzed to determine which object classes or identifiers link to media objects, like video files. When one of those webpages is requested by a user's web browser, the response is intercepted and a script is injected in the webpage code. The user's browser receives the webpage and executes the script, which includes or causes the browser to retrieve the set of pre-classified element identifiers for the webpage. When the user interacts with a page element having one of the pre-classified element identifiers, the script causes the browser to modify the user interface to provide enhanced functionality relating to the media object linked to by the page element (i.e., as opposed to the page element itself).

According to one set of embodiments, a method is provided for modifying graphical user interface behavior according to element identifier pre-classification. The method includes: intercepting, by a server system, webpage code being communicated from a content source in response to a browser request from a user system; determining that the webpage code corresponds to a webpage having a set of pre-classified element identifiers, each pre-classified element identifier indicating that a corresponding one or more page elements of the webpage links to an associated media object; and communicating a script with the webpage code to the user system in response to the determining step, the script executable by a web interface of the user system to modify graphical user interface behavior of the webpage when a user interfaces with any of the page elements of the webpage according to the set of pre-classified element identifiers.

According to another set of embodiments, a server system is provided. The system is disposed in a communications network between user systems and content sources and includes a server optimizer. The server optimizer is operable to: intercept webpage code being communicated from one of the content sources in response to a browser request from one of the user systems; determine that the webpage code corresponds to a webpage having a set of pre-classified element identifiers, each pre-classified element identifier indicating that a corresponding one or more page elements of the webpage links to an associated media object; and communicate a script with the webpage code to the user system in response to the determining step, the script executable by a web interface of the user system to modify graphical user interface behavior of the webpage when a user interfaces with any of the page elements of the webpage according to the set of pre-classified element identifiers.

According to another set of embodiments, another method is provided for modifying graphical user interface behavior according to element pre-classification. The method includes: requesting, via a web interface of the user system, a content page from a content source over a network; receiving content page code for the content page at the web interface in response to the requesting step; and executing a script at the web interface, so that detecting a user interaction with a page element of the content page via a graphical user interface causes the web interface to perform a number of steps. The steps include: determining whether an identifier of the page element is one of a set of pre-classified element identifiers of the content page indicating that the page element links to an associated media object; and modifying the graphical user interface by displaying, in response to detecting the user interaction when the identifier of the page element is one of the set of pre-classified element identifiers of the webpage, a graphical element in graphical association with the page element, the graphical element including information relating to the media object linked to by the page element.

According to another set of embodiments, a user system is provided. The user system is in communication with content sources via a server system over a communications network and includes a web interface and a client optimizer. The client optimizer is operable to: request, via the web interface, a content page from one of the content sources over the communications network; receive content page code for the content page at the web interface in response to the request; and execute a script at the web interface, so that detecting a user interaction with a page element of the content page via a graphical user interface causes the web interface to: determine whether an identifier of the page element is one of a set of pre-classified element identifiers of the content page indicating that the page element links to an associated media object; and modify the graphical user interface by displaying, in response to detecting the user interaction when the identifier of the page element is one of the set of pre-classified element identifiers of the webpage, a graphical element in graphical association with the page element, the graphical element including information relating to the media object linked to by the page element.

BRIEF DESCRIPTION OF THE DRAWINGS

The present disclosure is described in conjunction with the appended figures.

Figure 1:
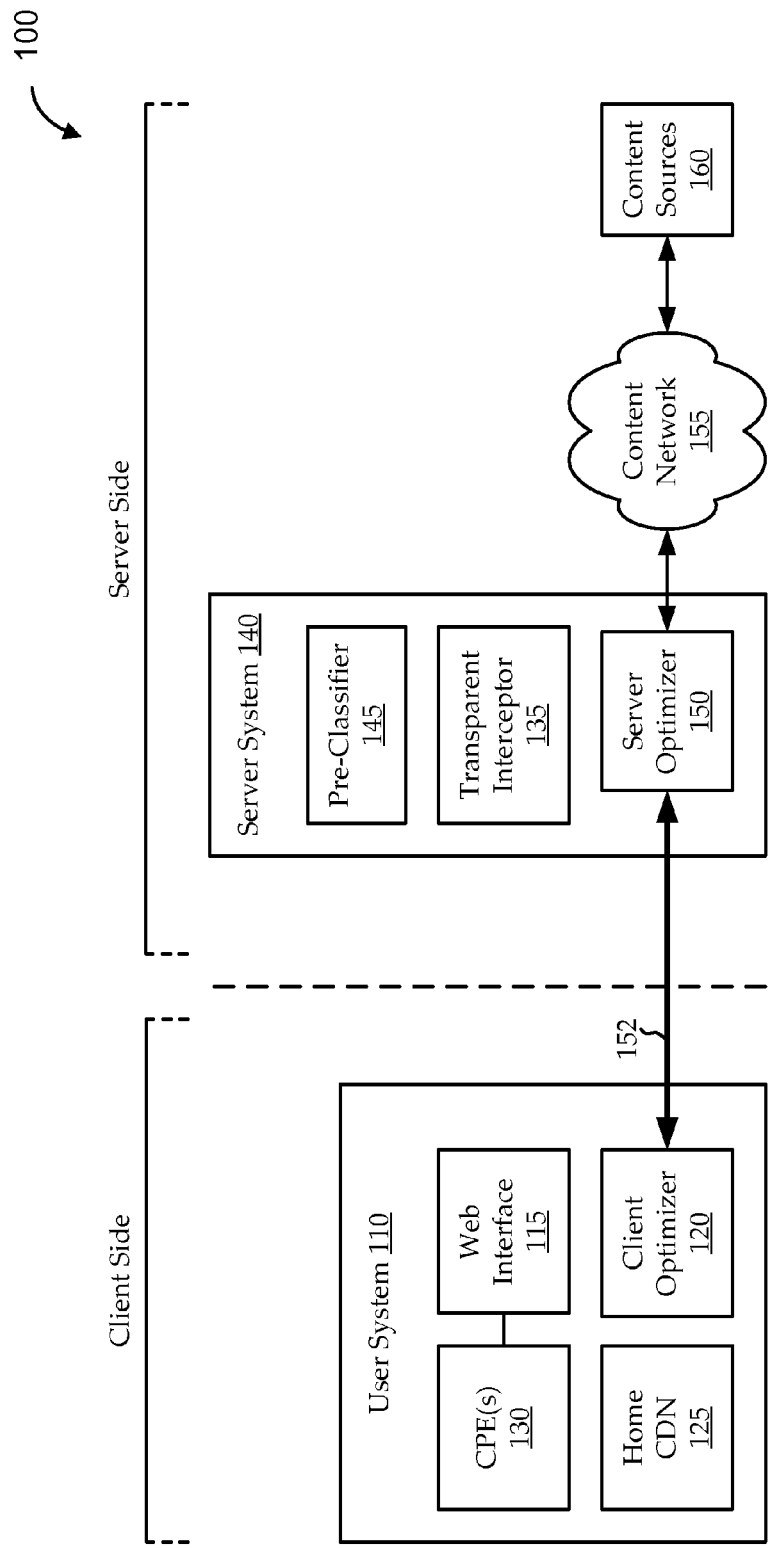
FIG. 1 shows a block diagram of an embodiment of a communications system having a server system in communication with a user system via a client-server link, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

Some embodiments described herein seek to address opportunities and limitations relating to users' media content access through data communications networks. For example, certain implementations allow media and communications services providers to help users find and access desired content, to monitor and understand user selection processes, and/or to otherwise present enhanced functionality in relation to user interactions with media objects and page elements that link to media objects. In particular, some embodiments include novel techniques for pre-classifying page element identifiers, so that enhanced functionality can be associated with the "page before" the media objects of interest. For example, a typical website includes a number of elements linking (directly or indirectly) to media objects. Rather than providing functionality in response to a user requesting downloading or streaming of one of the media objects itself, pre-classification is used to provide the functionality in relation to the elements that link to those movie files. While certain embodiments described herein focus on pre-classification with respect to media objects, similar or identical techniques can be used for pre-classification with respect to other types of objects of interest without departing from the scope of those embodiments.

For the sake of illustration, a media service is offered that allows subscribers to store large amounts of media content in a local data store. When a subscriber accesses a popular web-based movie aggregator (e.g., Netflix.com), the webpage shows a number of movie images, each linking to an associated movie video file. The service provider desires, whenever the subscriber mouses over one of the movie images on the webpage, to indicate via the webpage to the subscriber whether the associated movie video file is already locally stored in that subscriber's local data store. Certain embodiments allow the service provider to provide this functionality prior to accessing the media object itself and without directing the subscriber away from the aggregator's website.

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring the present invention. Further, terms such as "optimize" are intended to connote a relative or desired outcome, rather than an absolute outcome, and should not be considered as limiting potential embodiments. For example, embodiments described with reference to optimization are intended to include even variations deemed to be sub-optimal.

Turning first to FIG. 1, a block diagram is shown of an embodiment of a communications system 100 having a server system 140 in communication with a user system 110 via a client-server link 152, according to various embodiments. While only one user system 110 is shown, the server system 140 is typically in communication with a number of user systems 110 over one or more client-server links 152. The client-server link 152 can include one or more of any suitable type of communications link and can be part of one or more of any suitable type of network, including, for example, leased high-bandwidth lines (e.g., raw Ethernet), virtual private large-area network services (VPLS), Internet protocol virtual private networks (IP VPN), or other types of public or private, wired or wireless networks. In some implementations, the server system 140 is implemented in a satellite provider network (e.g., in a gateway or core node of a satellite communications network) and is in communication with each user system 110 over a satellite communications link (e.g., via a carrier of a spot beam of a satellite).

The server system 140 is further in communication with one or more content sources 160 via one or more content networks 155. The content sources can include content servers and/or other suitable sources. Further, the content networks 155 are intended generally to include any suitable public or private, wired or wireless (e.g., short-range or long range, cellular, satellite, etc.) network components, nodes, or networks used to deliver content to user systems 110 via server systems 140. While the content sources 160 and content networks 155 are shown as separate from the server system 140, they may be implemented in any suitable manner, including as part of the server system 140. Some functionality described herein relates to provision of media content, such as movies, over the communications system 100. Accordingly, at least some of the content sources 160 are assumed to be sources of media content objects. For example, a content source 160 can be a content service provider website that provides users with access to movies, music, and/or other media over the Internet via their respective user system 110 and server system 140.

Various types of functionality are described herein relating to communications between the server system 140 and the one or more user systems 110. Server-side communications will also be referred to as communications relating to the server, service provider, or the like. User-system-side communications will also be referred to as communications relating to the user, client, subscriber, consumer, customer, or the like. For example, many functions described herein are only available to subscribers of certain services from a service provider. The service provider can own and/or control some or all of the components that facilitate the functionality, such as the server system 140. In some embodiments, the service provider also owns some or all of the content sources 160, user systems 110, infrastructure components, etc.

As will be described more fully below, embodiments of the user systems 110 are configured to perform various types of functionality using a client optimizer 120. For example, the client optimizer 120 can help manage content requests and content delivery. In some implementations, the client optimizer 120 is in communication with the server optimizer 150 of the server system 140 in such a way as to effectuate advanced optimization functions. For the sake of simplicity, certain client-server types of functionality can be referred to as involving communications over a virtual (or logical) client-server link 152, though this "link" may, in fact, include a number of physical links from one or more communications infrastructures. For example, the client optimizer 120 and the server optimizer 150 can act as a proxy client and a proxy server, respectively, in communication over a proxy tunnel (i.e., the client-server link 152) that facilitates acceleration, optimization, and other functionality.

In some embodiments, the user systems 110 include one or more customer premises devices (e.g., set-top boxes, televisions, home network devices, etc.), referred to as "customer premises equipment" or "CPE" 130. Embodiments are also configured to implement a home content distribution network (CDN) 125. The home CDN 125 can include any useful types of storage and/or networking components. For example, embodiments of the home CDN 125 can include a single storage device (e.g., a server or disk drive), distributed local storage (e.g., a RAID array, set of servers, etc.), networked storage (e.g., using a local area network, a storage area network, "cloud" storage, or the like), etc. Various embodiments of the client optimizer 120 are configured to manage (e.g., direct, monitor, etc.) functions of the CPE(s) 130, the home CDN 125, communications among those components, communications between those components and other nodes of the communications system 100, etc.

As illustrated, the user system 110 can include one or more web interfaces 115. Each web interface 115 is typically accessible through a CPE 130. As used herein, a "web interface" is intended generally to include any technology that runs on a processor to enable network data communications functionality. For example, a web interface 115 can be a web browser accessible through a laptop or tablet computer, a smart phone, a web-enabled televisions set or set-top box, etc. Alternatively, the web interface 115 can be a productivity, entertainment, or other application, applet, widget, portal, etc. that functions at least in part by accessing content over a communications network, like the Internet.

Embodiments of the server system 140 include a transparent interceptor 135 and a pre-classifier 145. In some implementations, the transparent interceptor 135 and/or the pre-classifier 145 are functions of the server optimizer 150. According to some embodiments, the server optimizer 150 (e.g., the transparent interceptor 135) intercepts webpage code being communicated between the content sources 160 and the user systems 110 via the respective web interfaces 115. As used herein, terms like "webpage" are intended to include any type of user interface pages or portions of pages (also referred to herein as "content pages") having content retrieved via the communications system 100. For example, a webpage can be a page of a website, a page of a network-enabled application, etc. Similarly, terms like "webpage code" (also referred to herein as "content page code") are intended to include any type of code used by a user interface to generate some or all of a webpage or content page having content retrieved via the communications system 100. For example, webpage code can include hypertext markup language (HTML) code, Java or Javascript code, Android code, iOS code, other embedded device operating system code, etc.

The client optimizer 120 and server optimizer 150 can be implemented in such a way that the server optimizer 150 acts as a transparent (e.g., "man-in-the-middle") proxy that can transparently intercept requests and/or responses for processing (i.e., the transparent interceptor 135). For example, when a user requests media from a website, the request is made via a web interface 115 of a CPE 130 and is communicated over the client-server link 152, where it is intercepted by the server optimizer 150 on its way to a content source 160 associated with the website. When the content source 160 responds to the request, the server optimizer 150 can intercept the response on its way to the requesting user system 110. In this way, the request and/or response can be handled (e.g., interpreted, processed, modified, delayed, etc.) in such a way that allows the service provider to add desired functionality.

The server optimizer 150 functionality can be used to modify graphical user interface behavior according to element identifier pre-classification. In some embodiments, content pages and/or content domains are analyzed to pre-classify element identifiers. Each content page includes a number of page elements, like text, images, videos, frames, etc. Some of these elements are media objects (e.g., video files), while others of these elements link to media objects (e.g., using "HREF" or similar commands in HTML). Each page element has an associated element identifier, such as an "object class," "object ID," or the like. Different content pages can be programmed in different ways using different types of element identifiers. For example, a programmer can create an object ID called "videocontainer" for certain page elements that point (e.g., link) to certain types of media using the following illustrative code segment:

<DIV ID="videocontainer">
<IMG SRC="http://imagedomain.com/image.jpg">
</DIV>

Pre-classifying a content page or domain involves generating a set of pre-classified element identifiers, such that each element identifier in the pre-classified set indicates that a corresponding one or more page elements of the webpage links to an associated media object. In the above example, it is determined that any page element having an object ID of "videocontainer" links to a video file. A single content page or domain can include one or more pre-classified types of element identifiers, and each element identifier can be used to identify one or more page elements (i.e., multiple page elements can have the same element identifier).

Embodiments can pre-classify element identifiers in different ways. According to some embodiments, the pre-classifier 145 of the server system 140 fetches content page code and effectively crawls the code hierarchy to find and analyze different element identifiers. Determining which element identifiers are of interest can involve code parsing techniques (e.g., finding link references to particular target types, like video files, and determining which types of page elements are associated with those link references), keyword analysis (e.g., "video" in a page element or element identifier name), modeling techniques (e.g., statistical or other techniques that suggest a likelihood of certain page element characteristics based on previous determinations), etc. According to other embodiments, some or all of the pre-classification is performed manually. For example, a person can analyze content pages or domains by fetching and reviewing the content page code. Over time, content pages, and their respective element identifiers, can be added, removed, modified, etc. Accordingly, pre-classification of a particular content page or domain can be performed one time, periodically, continually, on demand, and/or in any other suitable way.

As discussed above, pre-classification results in a set of pre-classified element identifiers. In some implementations, one set of pre-classified element identifiers is maintained for all content pages and/or domains. In other implementations, separate sets of pre-classified element identifiers are maintained for each content page, sets of content pages, each domain, sets of domains, etc. The set of pre-classified element identifiers can be maintained in any suitable data format. In one embodiment, the set of pre-classified element identifiers is stored as an array in a Javascript file (e.g., "elements.js").

For the sake of illustration, a user requests a website by typing a web address into a web browser, and the browser issues the request to the appropriate content source 160. The response from the content source 160 includes webpage code that can be intercepted by the transparent interceptor 135 for further processing. In some embodiments, the transparent interceptor 135 determines whether the webpage code corresponds to a webpage having a set of pre-classified element identifiers. For example, the transparent interceptor 135 determines whether the webpage is from a domain that has been pre-classified or from a particular set of content pages that have been pre-classified. As described above, a "pre-classified content page" or a "pre-classified domain" refers to a page or domain for which a set of pre-classified element identifiers has been generated.

If it is determined that the requested webpage includes pre-classified element identifiers, the server optimizer 150 (e.g., the transparent interceptor 135) can communicate a script with the webpage code to the user system 110 according to the determination. The script is communicated in any suitable way that causes or allows it to be appropriately executed by the user system 110 (e.g., by the web interface 115). In one implementation, the script is communicated as a separate response along with or in relation to the webpage code. In another implementation, the script is injected into the webpage code. For example, in an HTML page, the server optimizer 150 can insert a script call (e.g., "<script text/ javascript src=intercept.js>") in front of the "</BODY>" tag (or replace the tag with a script call and the tag). In other embodiments, other portions of the underlying webpage code are identified for script insertion or injection. For example, the script can be inserted in front of the "</HEAD>" tag, or in any other suitable location.

Some embodiments only communicate (e.g., inject) the script when certain criteria are met. In one implementation, the script is only communicated when the requested content page is an HTML page. In another implementation, the script is only communicated when the requested content page is from one of a set of pre-classified domains.

Embodiments use the script to modify graphical user interface behavior of the content page when a user interfaces with any of the page elements of the webpage according to the set of pre-classified element identifiers. Accordingly, it is desirable to have the set of pre-classified element identifiers accessible to the web interface 115 (or whichever component is executing that functionality of the script). In some implementations, the set of pre-classified element identifiers is a file maintained at the user system 110 (e.g., in browser cache, in a cookie, in a file on local storage, in user modem cache, etc.). The file can be periodically updated, refreshed, etc., or otherwise maintained sufficiently up to date. In other implementations, the set of pre-classified element identifiers is hard-coded in the communicated script. For example, rather than having the script call another object (e.g., another script, file, etc.), the code of the script includes the set of pre-classified element identifiers.

In still other implementations, the set of pre-classified element identifiers is stored at the server system 140 (e.g., or in a location in operative communication with the server system 140, like cloud storage). For example, the script executed by the web interface 115 has an "include" or similar command that points to the server-side set of pre-classified element identifiers (e.g., an array stored as "elements.js"). When the web interface 115 (e.g., or the client optimizer 120) executes the script, the code causes another request to be made for the set of pre-classified element identifiers from the server system 140 (e.g., from the pre-classifier 145). In response to the request, the server system 140 communicates the set of pre-classified element identifiers for the webpage to the user system 110.

Having executed the script and having provided the script with access to the set of pre-classified element identifiers, the script can be used to modify user interface behavior according to the pre-classified element identifiers for the displayed content page. In some embodiments, with the script running, the web interface 115 can respond to interactions between the user and the displayed content page via a human interface device (e.g., a mouse) or the like. For example, a mouse event is detected that indicates interaction between the user with the graphical user interface in a location associated with one of the page elements. A determination is made that at least one of the stack of page elements at that location is associated with one of the pre-classified page element identifiers. In response to that determination, the graphical user interface behavior can be modified. For example, a graphical element is displayed in graphical association with the page element to displaying information relating to the media object linked to by the page element. The graphical element can be displayed in any suitable way. For example, in an HTML page, the script can create a "<div>" for the graphical element and associate the "<div>" with a high Z index (e.g., a higher Z index than any Z index associated with the page elements corresponding to the pre-classified element identifiers). This or a similar technique can be used to ensure that the graphical element displays in front of (i.e., is not hidden behind) other page elements.

In some embodiments, information displayed in response to detecting interaction with a page element having a pre-classified element identifier is not available from within the web interface 115. For example, determining whether a requested movie is available and determining an appropriate charge for retrieving the movie may involve determining what is stored in local storage (e.g., in the home CDN 125), what is available from a certain subset of content sources 160 (e.g., those with special contractual relationships), present network link characteristics (e.g., available bandwidth), user account information, etc. Accordingly, the script may cause the web interface 115 and/or other components of the user system 110 to query outside the web interface 115 to determine relevant information, like present local availability of the media object linked to by the page element. The "query" can be any suitable type of call. In one implementation, the script makes an API call relating to a request for the media object (e.g., a "Javascript object notation," or "JSON," type of call).

For the sake of illustration, a user hovers over an icon that links to a movie (e.g., a mouse-over event is detected at a location associated with the icon). The script determines according to the detection that the icon is (or is in the same location as) identified with one of the set of pre-classified element identifiers. Accordingly, the script brings up a window adjacent to the mouse pointer that displays information relating to the movie. For example, the window can indicate whether some or all of the movie is presently stored in the user's home CDN 125, whether the movie is part of the user's media plan, various formats in which the movie is available, ratings information, etc.

Figure 2:
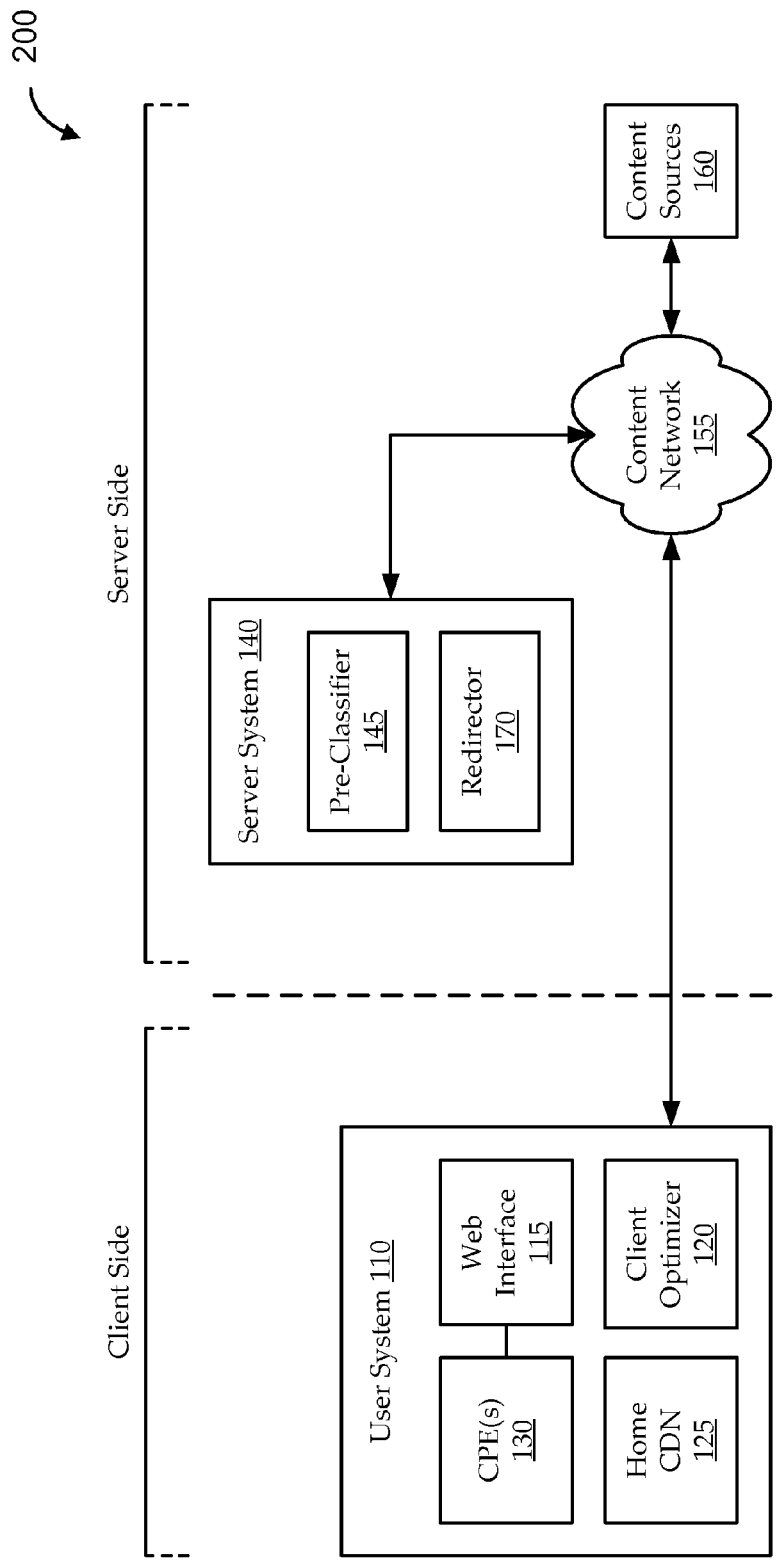
FIG. 2 shows a block diagram of another embodiment of a communications system having a user system in communication with content sources via a server system, a client-server link, and content networks, according to various embodiments.

FIG. 2 shows a block diagram of another embodiment of a communications system 200 having a user system 110 in communication with content sources 160 via a server system 140, a client-server link 152, and content networks 155, according to various embodiments. The communications system 200 of FIG. 2 can be used to implement similar or identical functionality to the functionality described above with reference to the communications system 100 of FIG. 1. As described above, the server system 140 is further in communication with one or more content sources 160 via one or more content networks 155. Further, embodiments of the user system 110 are implemented in a manner that is similar or identical to the user system 110 described above with reference to FIG. 1. For example, the user system 110 is illustrated as including one or more CPEs 130, a home CDN 125, a client optimizer 120, and one or more web interfaces 115.

As illustrated, the server system 140 includes a server optimizer 150, a pre-classifier 145, and a redirector 170. In some implementations, the pre-classifier 145 and/or the redirector 170 are functions of the server optimizer 150. As in FIG. 1, the pre-classifier 145 generates a set of pre-classified element identifiers (e.g., manually, automatically, and/or in any other suitable manner). Embodiments of the redirector 170 act as a non-transparent interceptor. For example, in implementations where the service provider controls only a limited portion of the communications infrastructure, it may be difficult or impossible to implement a transparent proxy (e.g., the transparent interceptor 135 of FIG. 1). However, it may still be possible to implement a redirector 170 as described below.

According to some embodiments, the redirector 170 intercepts media requests and/or responses for processing. For example, when a user requests media from a website, the request is made via a web interface 115 of a CPE 130 and is communicated over the client-server link 152, where it is intercepted by the redirector 170 of the server optimizer 150 on its way to a content source 160 associated with the website. For example, the web interface 115 issues a "GET" request or the like for a webpage that includes a pre-identified script call (e.g., a JavaScript call the server optimizer 150 expects to see as part of a request to a particular website or websites). The server optimizer 150 detects the pre-identified script call and issues a redirect response to the web interface 115 (e.g., a "302 redirect"). The redirect response code includes a redirect address at which redirect code is stored (e.g., a redirect webpage, a redirect server, etc.) and a transaction identifier.

When the web interface 115 receives the redirect response, it opens a new connection (e.g., a transmission control protocol (TCP) connection) to the redirect address and issues a second request (e.g., another "GET") with the transaction identifier. Any response to the original request from the content source will be ignored by the web interface 115, as a response (i.e., the redirect response) has already been received. When the second request is received at the redirect address, a response is issued with a script designed to be executed by the web interface 115 in such a way as to modify graphical user interface behavior according to element identifier pre-classification (e.g., as described above). For example, if it is determined that the requested webpage includes pre-classified element identifiers, the server optimizer 150 can communicate a script with the webpage code to the user system 110 according to the determination as a separate response message, injected or otherwise included in the response message from the content source 160, or in any other suitable way. When the user system receives the script, it is executed (e.g., by the web interface 115), thereby causing the web interface 115 to modify its graphical user interface behavior in response to interactions between the user and the displayed content page according to the set of pre-classified element identifiers. In some embodiments, the script directs the browser to execute a number of tasks, including, for example, executing the script for modifying graphical user interface behavior of the webpage, executing the pre-identified script call that was part of the first request, and performing any message accounting.

Figure 3:
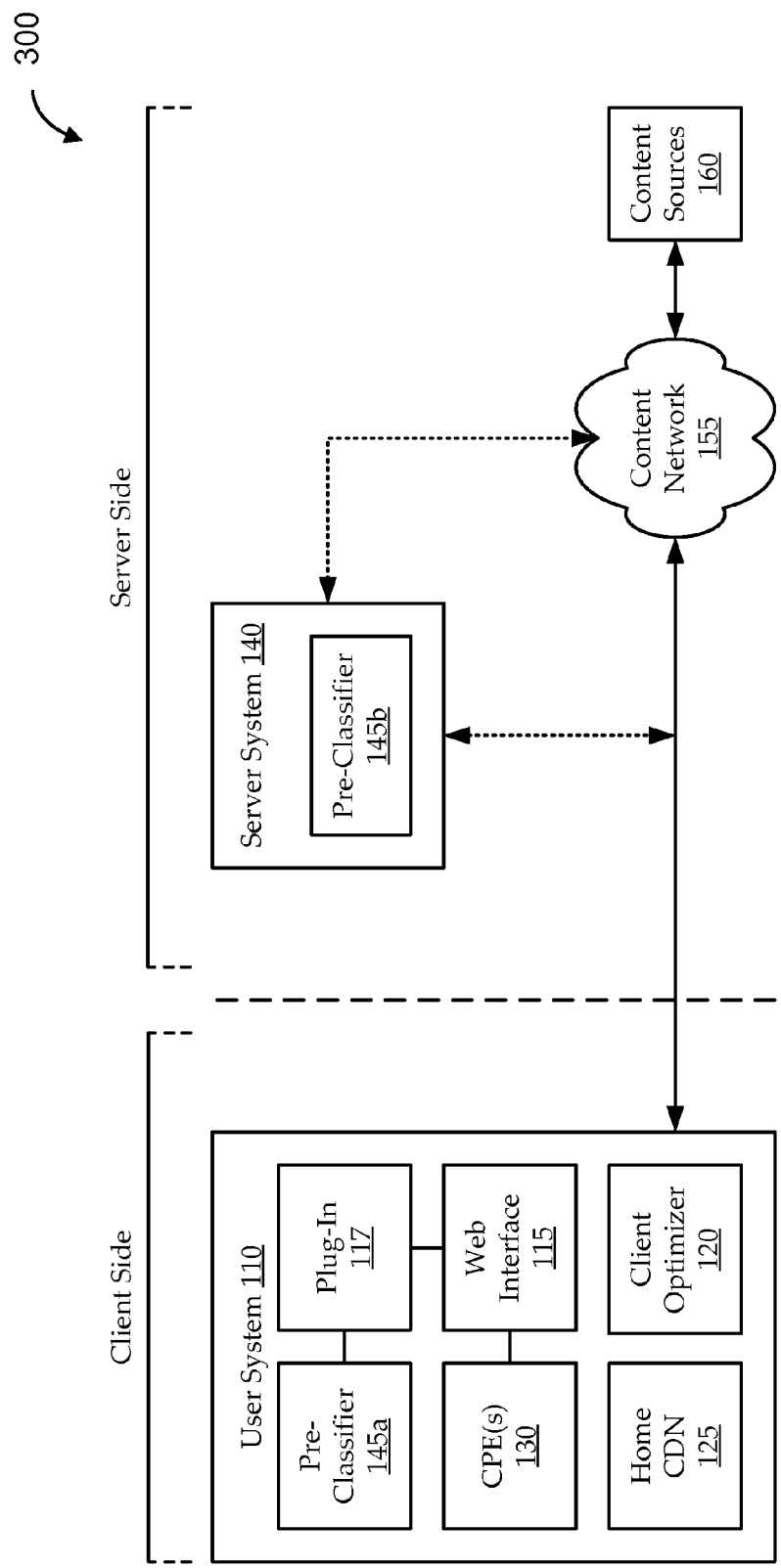
FIG. 3 shows a block diagram of still another embodiment of a communications system having a user system in communication with content sources via a server system, a client-server link, and content networks, according to various embodiments.

FIG. 3 shows a block diagram of still another embodiment of a communications system 300 having a user system 110 in communication with content sources 160 via a server system 140, a client-server link 152, and content networks 155, according to various embodiments. The communications system 300 of FIG. 3 can be used to implement similar or identical functionality to the functionality described above with reference to the communications systems of FIGS. 1 and 2. As described above, the communications systems of FIGS. 1 and 2 are configured to implement pre-classification, interception, scrip injection, and/or other functionality at the server side using components of the server system 140. The communications system 300 of FIG. 3 illustrates embodiments for providing the same or similar functionality at the client side using components of the user system 110.

The user system 110 can include one or more CPEs 130, a home CDN 125, a client optimizer 120, and one or more web interfaces 115. As illustrated, the user system 110 also includes a plug-in 117. As used herein, "plug-in" is intended generally to refer to client-side instructions, executable by a processor to enhance functionality of the web interface 115 to perform some or all of the functions described herein. For example, the plug-in 117 can be a browser plug-in of a web browser, or other software (or hardware, firmware, etc.) running within the web interface 115, in a CPE 130, in a client modem, or in any other client-side device or system. Functionality of the plug-in 117 will be described more fully below.

The server system 140 can be implemented in various ways and may include some or all of the components (and/or additional or different components) described above with reference to FIGS. 1 and 2. As FIG. 3 is intended to describe client-side implementations, it is assumed that the server system 140 does not provide any interception or redirection functions (at least for the purposes described herein). Still, in some implementations, the server system 140 can provide optimization and/or other functionality using a server optimizer or the like (not shown). Further, in some implementations, the server system 140 performs some or all of the pre-classification functionality (e.g., using pre-classifier 145b). In other implementations, some or all of the pre-classification functionality is performed by the user system (e.g., using pre-classifier 145a). As described above, pre-classification results in a set of pre-classified element identifiers, whether performed by the server system 140 or by the user system 110.

According to some embodiments, the plug-in 117 handles media requests and/or responses to provide the script functionality described above. For example, when a user requests media from a website, the request is made to a content source 160 associated with the website via a web interface 115 of a CPE 130. When the content source 160 responds, the response is processed (e.g., monitored and/or otherwise handled) by the plug-in 117 to determine whether the response relates to a content page or domain having pre-classified element identifiers. If so, the plug-in 117 can cause a script to be executed that can modify graphical user interface behavior according to the element identifier pre-classification. For example, if it is determined that the requested webpage includes pre-classified element identifiers, the plug-in 117 can inject the script into the content page code for execution by the web interface 115, or the plug-in 117 can execute the script in response to receiving the content page code. Having executed the script, the web interface 115 can modify its graphical user interface behavior in response to interactions between the user and the displayed content page according to the set of pre-classified element identifiers.

Some embodiments of the user system 110 handle certain media requests and/or responses using redirect techniques similar to those described above with reference to server-side implementations for providing the script functionality described above. For example, some or all of the client optimizer 120 functions are implemented in a user modem (not shown) in communication with the web interface 115, so that any requests from the web interface 115 to the server system 140 and/or content network 155 pass through the user modem. When a user requests a content page from a content source 160 (e.g., a webpage from a website), the request is made via the web interface 115 and is intercepted by the user modem for processing by the client optimizer 120. For example, the web interface 115 issues a "GET" request or the like for a webpage that includes a pre-identified script call (e.g., a JavaScript call the client optimizer 120 expects to see as part of a request to a particular website or websites). The client optimizer 120 detects the pre-identified script call and issues a redirect response to the web interface 115 (e.g., a "302 redirect"). The redirect response code includes a redirect address at which redirect code is stored (e.g., a redirect webpage, a redirect server, etc.) and a transaction identifier.

When the web interface 115 receives the redirect response, it opens a new connection (e.g., a transmission control protocol (TCP) connection) to the redirect address and issues a second request (e.g., another "GET") with the transaction identifier. Any response to the original request from the content source will be ignored by the web interface 115, as a response (i.e., the redirect response) has already been received. When the second request is received at the redirect address, a response is issued with a script designed to be executed by the web interface 115 in such a way as to modify graphical user interface behavior according to element identifier pre-classification (e.g., as described above). For example, if it is determined that the requested webpage includes pre-classified element identifiers, a script can be communicated with the webpage code to the user system 110 (e.g., from the redirect address) according to the determination as a separate response message, injected or otherwise included in the response message from the content source 160, or in any other suitable way. When the user system 110 receives the script, it is executed (e.g., by the web interface 115), thereby causing the web interface 115 to modify its graphical user interface behavior in response to interactions between the user and the displayed content page according to the set of pre-classified element identifiers. In some embodiments, the script directs the browser to execute a number of tasks, including, for example, executing the script for modifying graphical user interface behavior of the webpage, executing the pre-identified script call that was part of the first request, and performing any message accounting.

Figure 4:
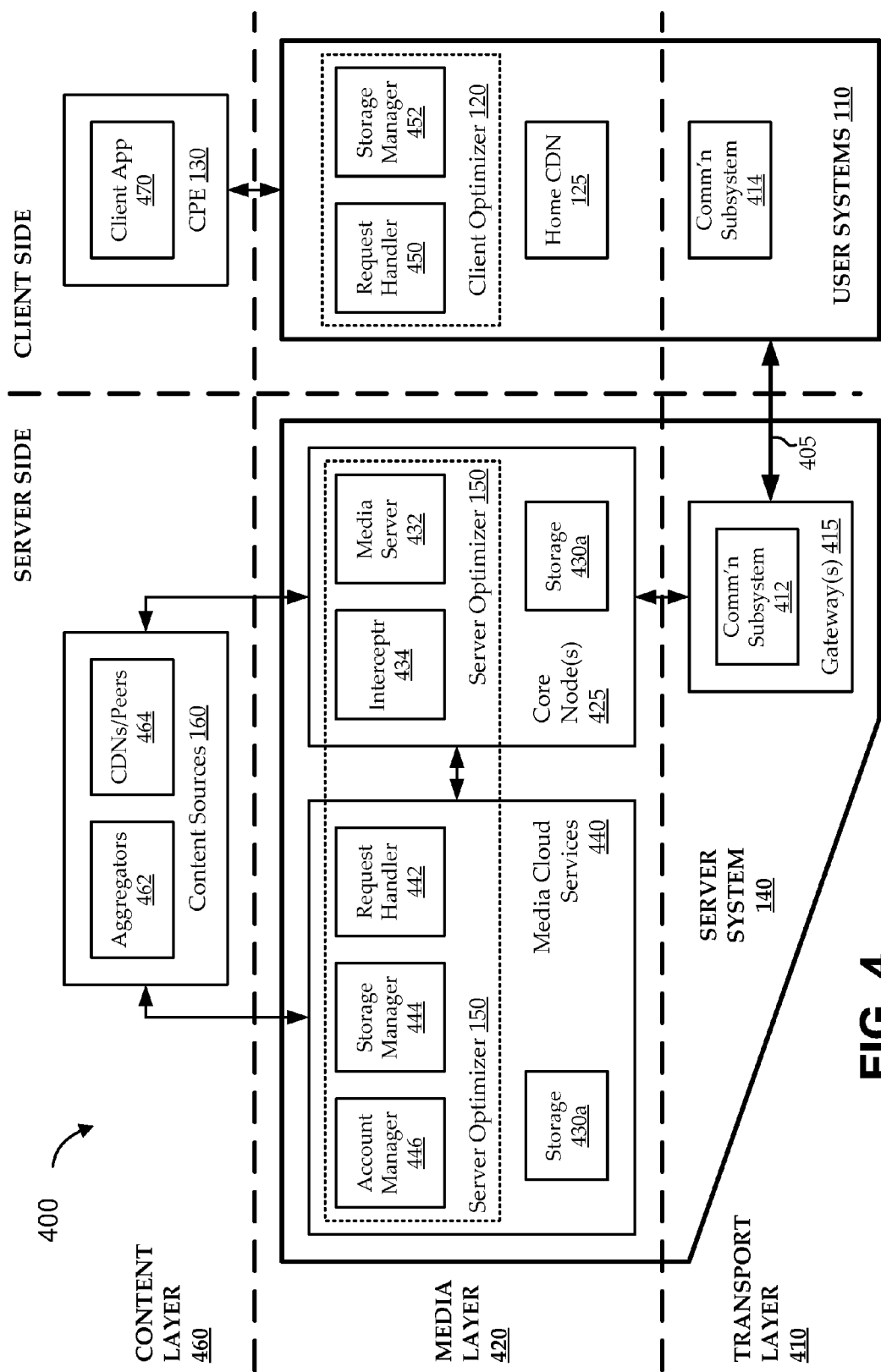
FIG. 4 shows a simplified block diagram of an illustrative communications architecture in which a server system is in communication with content sources and user systems, according to various embodiments.

FIG. 4 shows a simplified block diagram of an illustrative communications architecture 400 in which a server system 140 is in communication with content sources 160 and user systems 110, according to various embodiments. For the sake of clarity, the communications infrastructure 400 can be considered as a client-server architecture having a client side and a server side, and the communications infrastructure 400 can be representative of certain implementations of communications systems, like those described above with reference to FIGS. 1-3. The functionality can also be considered as operating at a transport layer 410, a media layer 420, and a content layer 460. These layers are not intended to match traditional layers of the Open Systems Interconnection (OSI) model or another standard protocol or the like. Rather, the layers are intended only to provide a general categorization of functionality for added clarity and should not be construed as limiting the scope of embodiments. Embodiments of the content layer 460 generally include components for providing content data. Embodiments of the media layer 420 generally include components for determining how to handle the content data with regard to providing media and related services to subscribers. Embodiments of the transport layer 410 generally include components for handling transport of data between the server system 140 and user systems 110 at least in support of the provided media and related services.

As illustrated, content can be communicated from one or more content sources 160 to one or more end-user devices (shown as CPE(s) 130). For example, a content request can be initiated by a CPE 130 and interpreted by an associated user system 110 for communication over the communications infrastructure 400 (e.g., a satellite or other communications environment). The user system 110 communicates the request to a server system 140 over a communications link 405. The server system 140 can then attempt to fulfill the content request by requesting and receiving content from one or more content sources 160. For the sake of illustration, the content request is a request for a media content object (e.g., a movie) from a content service provider website.

Turning first to the server system 140 functionality, embodiments provide and handle media and related services with user systems 110 over an infrastructure illustrated by link 405. For the sake of simplicity, embodiments are described with reference to a satellite communications infrastructure, though the same or similar functionality can be provided using other communications infrastructures. The server system 140 is illustrated as a distributed architecture, with functionality spread between gateways 415, core nodes 425, and media cloud services 440. In one illustrative embodiment, gateways 415 are geographically distributed, and each includes one or more base stations for handling communications over one or more spot beams and/or carriers. Each of multiple gateways feeds into one or more core nodes 425 of a backhaul network. Each core node 425 can then have high-bandwidth, high-reliability connections to the Internet, allowing effective implementation of certain services in the "cloud" (e.g., multiple distributed servers in communication over the Internet), illustrated as media cloud services 440.

In any of these or other architectures, various types of data can be communicated upstream and/or downstream to facilitate functionality by different components, at different layers, etc. For example, the communications subsystem 412 can monitor actual present usage and conditions of the link 405 with respect to user systems 110, which it can communicate periodically to the upstream server optimizer 150. The server optimizer 150 can use this data to determine when and how to make opportunistic use of the network and/or content traversing the network. Data relating to these determinations can then be passed back to the communications subsystem 412 for use in determining appropriate transport protocols, link scheduling, and the like.

As illustrated, the server system 140 interfaces with link 405 via at least a gateway 415. Embodiments of the gateway 415 implement functionality of a communications subsystem 412. Embodiments of the communications subsystem 412 are configured to handle upstream and downstream communications with the service provider's communications system, for example, a satellite communications system via one or more server-side antennas. Implementations perform various functions, including, for example, encoding (e.g., adaptively), decoding, modulating (e.g., adaptively), demodulating, applying or processing error correction techniques, baseband encapsulating, frame creation, etc. (e.g., using various modcodes, lookup tables, etc.). Other functions can include upconverting, amplifying, filtering, tuning, tracking, etc. Embodiments of the communications subsystem 412 include modem termination functionality for receiving modem traffic over the satellite link from users, for example, configured as a satellite modem termination system ("SMTS").

Data or content requests received over the communications infrastructure 400 (e.g., from user systems 110) are passed from the communications subsystem 412 to one or more functions of the server optimizer 150 for processing. Embodiments of the server optimizer 150 include a media server 432, an interceptor 434, a request handler 442, a storage manager 444, and an account manager 446. In one embodiment, the media server 432 and interceptor 434 are implemented in the core node 425; while other functions of the server optimizer 150 are implemented in the media cloud services 440, though other module configurations and arrangements, data flows, etc. are possible according to other embodiments. Various embodiments of the server optimizer 150 provide various types of application, WAN/LAN, and/or other acceleration functionality, including resource optimization and subscriber handling functions. In certain embodiments, the server optimizer 150 implements functionality of AcceleNet applications from ViaSat, Inc. This functionality can be used to exploit information, for example, from application layers of the protocol stack (e.g., layers 5-8 of the Internet Protocol (IP) stack) through use of software or firmware operating in the user system 110 (e.g., in the user systems 110 and/or the CPE(s) 130).

Requests and/or other content received at the server system 140 can be intercepted by the interceptor 434 to determine appropriate handling. In some embodiments, the interceptor 434 is implemented as a transparent interceptor, like the transparent interceptor 135 of FIG. 1. In other embodiments, the interceptor 434 is a non-transparent interceptor, like the redirector 170 of FIG. 2. For example, while illustrated as part of the core node 425 functionality, the interceptor 434 may be implemented by a component in communication with the core node 425. In some cases, traffic intercepted by the interceptor 434 is passed to and processed by the request handler 442. Embodiments of the request handler 442 make various types of determinations, such as what type of content is being requested or processed or what type of request is received. In some embodiments, the request handler 442 is configured to analyze traffic to parse requests, analyze packet headers, and the like. In other embodiments, the communications subsystem 412 performs some or all of those functions, so that the request handler module 442 receives data that is ready for processing. For example, the request handler module 442 can determine that a media request relates to a content page or domain having pre-classified element identifiers. The request handler module 442 can then communicate (e.g., inject) a script as described above according to the determination.

In some embodiments, the request handler 442 includes functionality of or is in communication with the account manager 446. In some implementations, each subscriber or groups of subscribers have contractual relationships with the communications services provider. For example, subscribers can be associated with a plan that guarantees them a certain amount of resources (e.g., a total bandwidth consumption cap per month) for a certain price. Various plans can be offered, and various interactions can affect plan pricing, content delivery, etc. For example, subscribers can be able to pay extra for certain content (e.g., on-demand movies, pay-per-view events, etc.) or make decisions that reduce the impact of content delivery on their caps.

It is worth noting that embodiments of the account manager 446 can be used to facilitate many different types of functions relating to subscriber accounts. Some embodiments keep track of subscriber usage and subscription limits, and notify other components of the server system 140 accordingly. Other embodiments handle subscriber credentials, digital rights management issues, and/or the like to police the types of content that can be received from and/or sent to subscribers. For example, a subscriber can request a content channel only available to certain subscription levels, content requiring a login or other credentials, content from blocked or throttled websites, etc. Still other embodiments handle groups of subscribers, subscriber preferences, etc.

Many of the functions described herein are facilitated by embodiments of the storage manager 444 exploiting resources of one or more data stores of a storage subsystem 430. The storage subsystem 430 can include storage resources in the core nodes 425 and/or provided via media cloud services 440. In some embodiments, the storage subsystem 430 includes storage resources of the gateways 415 or other components (though not shown). Some embodiments facilitate extended subscriber storage, such as for subscriber-owned photos, movies, documents, etc. Other embodiments of the storage manager 444 use the storage subsystem 430 to facilitate edge server functionality, CDN functionality, or the like. The storage subsystem 430 can include any useful types of data storage, including, for example, servers, queues, buffers, drives, and/or the like.

As described above, embodiments of the server system 140 receive content data from content sources 160 that can be destined for one or more subscribers. The content sources can include content service providers 462 (e.g., an Internet movie subscription site), CDNs 464, and/or any other types of content sources (e.g., sources having a peering relationship with the server system 140, etc.). As illustrated, the content sources 160 can be in communication with the core nodes 425 and/or with the media cloud services 440. In some embodiments, additional components are included for interfacing with the content sources 160. Interface components can include network switches, routers, edge servers, traffic shapers, etc. For example, third-party edge servers can be adapted to mirror content (e.g., implementing transparent mirroring, like would be performed in a point of presence ("POP") of a CDN) to the server system 140 by facilitating contractual relationships between content providers and service providers to move content closer to users in a communications network. Traffic shapers can control traffic flow through the server system 140, for example, to help optimize performance of the communications system (e.g., by reducing latency, increasing effective bandwidth, etc.). In one embodiment, a traffic shaper is used to delay packets in a traffic stream to conform to a predetermined traffic profile.

The various server-side functions described above can be used to facilitate and/or enhance functionality of embodiments described with reference to FIGS. 1-3. For example, when a response is communicated from a content source 160, the response is intercepted by the interceptor 434 and processed by the request handler 442. A determination is made that the response relates to a content page or domain having pre-classified element identifiers, and one or more scripts is communicated (e.g., injected into the content page code), accordingly. When the script is received and executed by the user system 110, information can be provided to the user relating to the media objects linked to by the page elements having pre-classified element identifiers. In some cases, the information is determined according to data generated or monitored by the server system 140 components. For example, the information displayed to the user may relate to present link conditions according to data from the communications subsystem 412 or other components, to present availability of the content in the storage subsystem 430, etc.

While the functionality above is largely described with reference to server-side components, certain functionality can alternatively be performed by, or is otherwise facilitated or supported by, components of the user systems 110 and/or by joint functionality of server-side and client-side components. For example, client-server functionality can be facilitated by interactions between the server-side media server 432 and the client-side client application 470, with support from a number of other server- and client-side components.

Turning to the user systems 110, various implementations are possible. For example, the user system can be implemented as a subscriber modem (e.g., a satellite modem), a dedicated device, hardware or software of a set-top box, or in any other useful way. In one illustrative implementation, the user system 110 is embodied in a subscriber modem that includes a client optimizer 120 (e.g., as integrated hardware and/or software) and has one or more ports for communicating with a home CDN 125 and one or more CPEs 130. For example, the subscriber modem has a universal serial bus (USB) port, and the home CDN 125 is implemented on a USB thumb drive. In other implementations, the home CDN 125 can be implemented using internal storage of the modem or as other types of removable storage, networked storage, etc. The CPEs 130 can include televisions or video monitors, computers (e.g., laptops, tablets, etc.), smart phones, smart appliances, and/or any other equipment that can benefit from services provided over the communications infrastructure (and/or support equipment thereto).

Similar to the server-side functions described above, the client-side functions can be considered as transport layer 410, media layer 420, and content layer 460 functions. At the transport layer 410, data communicated over the communications link 405 can be handled using a communications subsystem 414. In some embodiments, the communications subsystem 414 of the user system 110 performs similar or identical functionality to that of the communications subsystem 412 of the server system 140. For example, when a signal is received via the communications subsystem 414, the communications subsystem 414 can amplify the signal, acquire the carrier, downconvert the signal, etc. Though not explicitly shown, other components and/or component functionality can be provided by the communications subsystem 414. For example, a media access control (MAC) module can provide certain network interface functionality, such as modulating, encoding, filtering, decrypting, and/or otherwise processing data. Other functionality can be provided by routers, switches, and/or the like. These and or other components can also process data upon receipt and/or prior to transmission using techniques, such as modulating and demodulating, encoding and decoding, multiplexing and de-multiplexing, filtering, parsing, packetizing, etc.

Embodiments of the communications subsystem 414 can also include other communications functionality for supporting local and/or other networking. In some embodiments, the communications subsystem 414 includes a hub, router, or the like for supporting a local area (e.g., WiFi) network. In other embodiments, the communications subsystem 414 supports other types of wired or wireless functions, such as Bluetooth, Ethernet, femtocell, or other functionality.

Media layer 420 functionality of the client system can be handed by a client optimizer 120 and a home CDN 125. The client optimizer 120 can be tailored to provide support for the media and related services facilitated by the server optimizer 150, including those described above. For example, the client optimizer 120 can perform functions relating to WAN/LAN, and/or other acceleration functionality as a proxy, an in-line accelerator, etc. As illustrated, the client optimizer 120 includes a request handler 450 and a storage manager 452. In some embodiments, the request handler 450 of the user system 110 performs at least functions that are complementary to those of the request handler 442 of the server system, and the storage manager 452 of the user system 110 performs functions that are complementary to those of the storage manager 444 of the server system.

Many of the functions described herein are facilitated by client-side storage, referred to herein as the home CDN 125. The home CDN 125 can include any types of storage, and those types of storage can be spread across one or more devices in one or more locations. For example, the home CDN 125 can include volatile or non-volatile storage, servers, files, queues, etc. implemented in or in communication with a subscriber modem, a set-top box, a local or non-local network, a CPE 130, etc. The data stores can be fully integrated and/or co-located, implemented as internal hard-disk drives, internal solid-state memory, attached peripherals (e.g., thumb drives, USB hard drives, etc.), wireless or networked peripherals (e.g., wireless drives, storage area networks, etc.), cloud storage, etc. Some functionality involves ensuring that certain types of data are stored locally.

In some embodiments, the storage manager 452 maintains, affects, and/or communicates information relating to the data stored in the home CDN 125. For example, the storage manager 452 can upload information to the server system 140 (via other components) to indicate when data is added to the subscriber libraries (e.g., in the form of an ACK or similar message), when data is removed from the subscriber libraries, etc. Embodiments of the storage manager 452 can also determine when newer content objects should replace older content objects in the subscriber libraries, when content objects in the subscriber libraries have become stale (e.g., because the content or related rights have expired, because newer version of the content exist, because the content is associated with a limited valid timeframe, etc.), when additional data is needed to fill in holes in content objects stored at the subscriber libraries, etc.

In general, embodiments of the request handler 450 can bridge interactions between users and the user system 110 with interactions between the user system 110 and the communications infrastructure. For example, the request handler 450 can interact with users via one or more graphical user interfaces GUIs (e.g., via a CPE 130) to receive content requests, interpret those user requests, and handle (e.g., fulfill) those user requests locally and/or via the communications infrastructure (e.g., by fulfilling content requests via the home CDN 125, prompting the user for additional information via the CPE 130, issuing requests over the communications infrastructure, etc.). For example, as described above, various functions involve modifying GUI behavior according to interactions between a user and page elements being displayed via the GUI.

As illustrated, user interactions typically occur at the content layer 460 via one or more CPEs 130. The CPEs can include any content-enabling device, such as a computer (e.g., tablet, laptop, etc.), television, set-top box, smart phone, media player, etc. Embodiments of the CPEs 130 include at least one client application 470 for facilitating media services or related functionality. In some embodiments, the client application 470 is a web browser or other web interface, such as the web interface 115 described above with reference to FIGS. 1-3. In other embodiments, the client application 470 includes software code configured to run on a processor of the CPE 130 (e.g., on a set-top box). In certain implementations, the client application 470 includes plug-in functionality, such as the functionality described with reference to the plug-in 117 of FIG. 3. The plug-in functionality and/or other client application 470 functionality can be used to facilitate novel functions described herein.

Some implementations provide different content communication paths between components of the user system 110. For the sake of illustration, suppose a user requests a movie using a GUI displayed via a CPE 130 (e.g., a television). If the request is for a private video file (e.g., a home movie, a purchased video, etc.) stored on the user's digital video recorder (e.g., the DVR is implemented as part of the home CDN 125), some implementations can allow the request to be handled directly by the DVR. For example, the DVR is part of a set-top box that handles the request without assistance from other components of the user system 110. Alternatively, the request is processed by the request handler 450, which determines that the subject of the request is locally available and directs the request to be fulfilled locally (the request handler 450 can also log the request, communicate details about the request to the server system 140 for statistical processing, etc.). If the request is for other types of movies, the request handler 450 can determine whether to fulfill the request locally, to process the request over the communications infrastructure (e.g., issue a request to a remote content source via the server system 140), to partially fulfill the request locally and fill in missing data using requests over the communications infrastructure, etc. As described above, information relating to each of these different content communication paths can be communicated to the user via the GUI according to interactions with page elements that have pre-classified element identifiers. For example, when a user hovers over a page element that links to a movie, information can display via the GUI relating to present local availability of the movie, etc.

The architecture 400 described above is one of many possible architectures for performing the functions described herein. For example, each component can be implemented in different ways, including using one or more components, hardware and/or software, custom and/or off-the-shelf components, etc. Accordingly, though embodiments are described herein with reference to particular components providing particular functionality as part of particular subsystems, similar functionality can be provided in other ways (e.g. by other components and/or at other locations in the architecture) without departing from the scope of embodiments. Further, though some components are similarly named in the server system 140 and the user systems 110, the similarity in names is intended only to add clarity and simplicity to the disclosure and not to imply that the components are implemented identically or perform identical functionality. Even further, the server system 140 and the user systems 110 can perform many other types of functionality and/or can include other components not discussed above.

Figure 5:
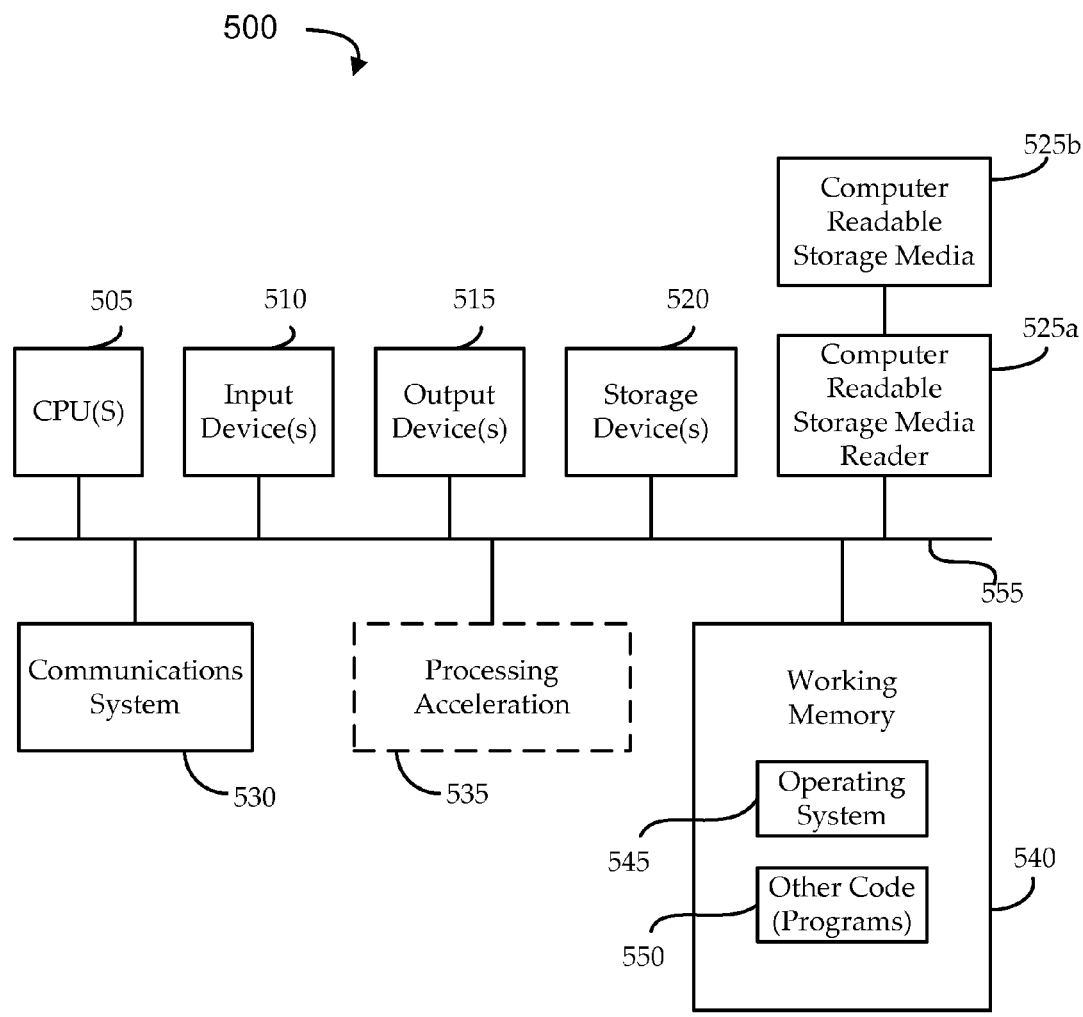
FIG. 5 shows an illustrative computational system for implementing functionality of a server system, a user system, or components thereof, according to various embodiments.

FIG. 5 shows an illustrative computational system 500 for implementing functionality of a server system 140, a user system 110, or components thereof, according to various embodiments. The computational system 500 can include or perform functionality of components of server system 140 or user system 110 embodiments, such as those described above in FIGS. 1-4. Embodiments of the computational system 500 can be implemented as or embodied in single or distributed computer systems, or in any other useful way. The computational system 500 is shown including hardware elements that can be electrically coupled via a bus 555.

The hardware elements can include one or more central processing units (CPUs) 505, one or more input devices 510 (e.g., a mouse, a keyboard, etc.), and one or more output devices 515 (e.g., a display device, a printer, etc.). The computational system 500 can also include one or more storage devices 520. By way of example, storage device(s) 520 can be disk drives, optical storage devices, solid-state storage device such as a random access memory (RAM) and/or a read-only memory (ROM), which can be programmable, flash-updateable and/or the like. In some embodiments, the storage devices 520 include or are in communication with the storage modules 550 of the server system 140 or the home CDN 125 of the user system 110, as described above.

The computational system 500 can additionally include a computer-readable storage media reader 525a, a communications system 530 (e.g., a modem, a network card (wireless or wired), an infra-red communication device, etc.), and working memory 540, which can include RAM and ROM devices as described above. In some embodiments, the computational system 500 can also include a processing acceleration unit 535, which can include a DSP, a special-purpose processor and/or the like.

The computer-readable storage media reader 525a can further be connected to a computer-readable storage medium 525b, together (and, optionally, in combination with storage device(s) 520) comprehensively representing remote, local, fixed, and/or removable storage devices plus storage media for temporarily and/or more permanently containing computer-readable information. Embodiments of the computer-readable storage medium 525b are implemented as one or more non-transitory storage media. The communications system 530 can permit data to be exchanged with a network and/or any other computer described above with respect to the computational system 500. For example, as described with reference to FIGS. 1-4, content traffic and/or other information can be communicated among various portions of the communications infrastructure via the communications system 530.

The computational system 500 can also include software elements, shown as being currently located within a working memory 540, including an operating system 545 and/or other code 550, such as an application program (which can be a client application, web browser, mid-tier application, relational database management system (RDBMS), etc.). In some embodiments, one or more functions of the client optimizer 120 or the server optimizer 150 are implemented as application code 550 in working memory 540. For example, the application code 550 can include instructions for implementing web interface 115 and/or plug-in 117 functionality, as described with reference to FIGS. 1-3 above.

It should be appreciated that alternate embodiments of a computational system 500 can have numerous variations from that described above. For example, customized hardware might also be used and/or particular elements might be implemented in hardware, software (including portable software, such as applets), or both. Further, connection to other computing devices such as network input/output devices can be employed. In various embodiments a computational system like the one illustrated in FIG. 5 is used to implement one or more functions of a user system 110 or server system 140, and the computational system is in communication with other functional components as needed or desired. In other embodiments, computational systems like the one illustrated in FIG. 5 are used to implement one or more methods of the system, such as those described below.

Various systems, subsystems, components, etc. can be used to implement novel functionality described herein. This and other functionality is further described below with reference to various method embodiments. In some cases, the method embodiments are described with reference to particular system implementations. However, embodiments of the systems described above can be used to perform functionality other than that described with reference to the methods below, and embodiments of the methods described below can be implemented using systems other than those described above.

Figure 6:
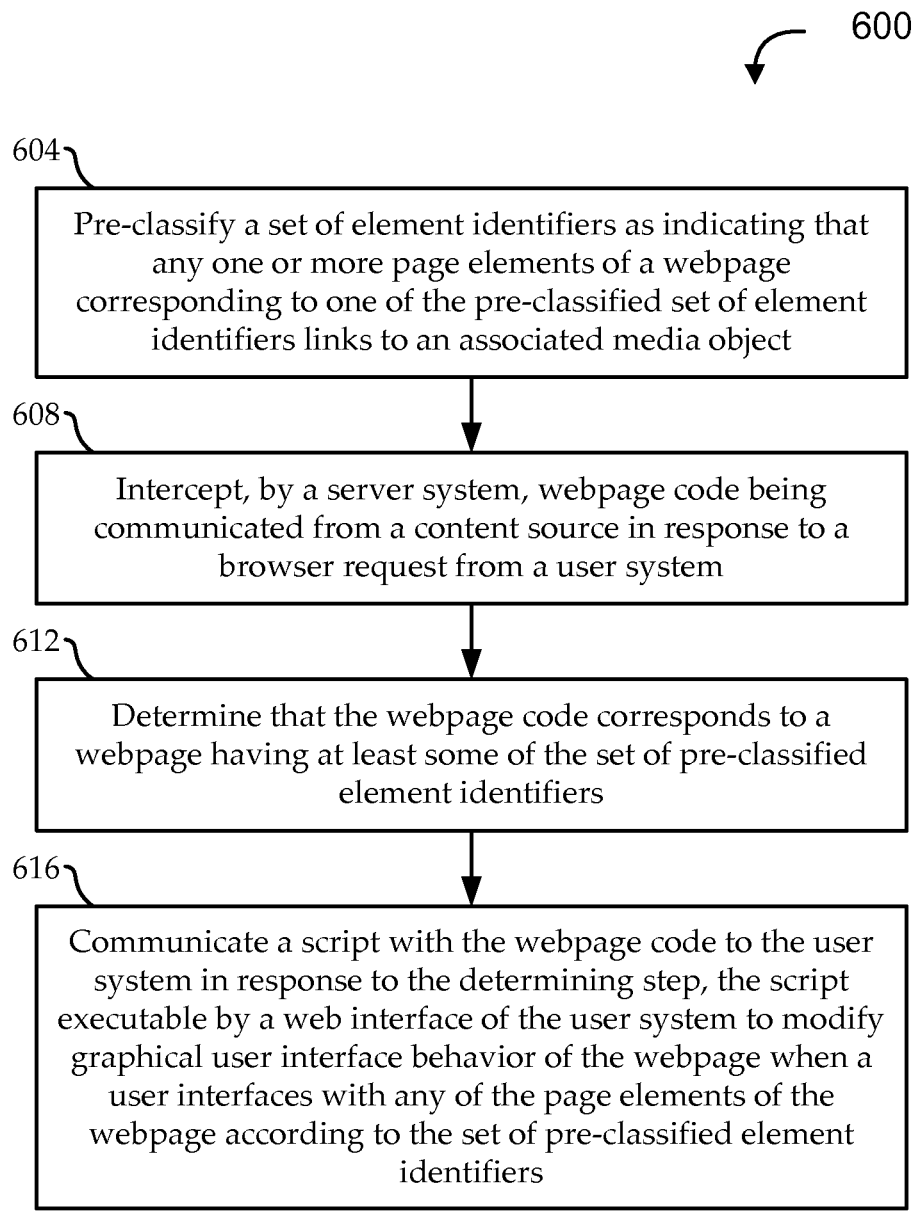
FIG. 6 shows a flow diagram of an illustrative method for modifying graphical user interface behavior according to element identifier pre-classification, according to various embodiments.

Turning to FIG. 6, a flow diagram is shown of an illustrative method 600 for modifying graphical user interface behavior according to element identifier pre-classification, according to various embodiments. Embodiments of the method 600 begin at stage 604 by pre-classifying a set of element identifiers as indicating that any one or more page elements of a webpage corresponding to one of the pre-classified set of element identifiers links to an associated media object. For example, content page code from multiple content pages and/or domains can be fetched and analyzed to determine which types of page elements link to media objects and which element identifiers are associated with those page elements. Pre-classifying the element identifiers can be performed manually or by an automated process and can be performed at any useful frequency (e.g., once, periodically, etc.). Further, the set of pre-classified element identifiers can be stored and/or maintained in any suitable manner, for example, as an array in Javascript code.

At stage 608, the server system intercepts webpage code being communicated from a content source in response to a browser request from a user system. For example, referring to FIG. 1, a client optimizer 120 and server optimizer 150 can be implemented in such a way that the server optimizer 150 acts as a transparent (e.g., "man-in-the-middle") proxy that can transparently intercept requests and/or responses for processing as a transparent interceptor 135. Referring as another example to FIG. 2, the server system 140 can be configured as a non-transparent interceptor (e.g., redirector 170) that resets the original content request and issues a new request for additional processing. Either way, the response is effectively intercepted by the server system 140 in such a way that the webpage code can be handled according to novel techniques described herein (e.g., to modify graphical user interface behavior according to element identifier pre-classification).

At stage 612, a determination is made that the webpage code corresponds to a webpage having at least some of the set of pre-classified element identifiers. For example, the response from the content source 160 includes webpage code that can be processed to determine that the webpage is from a domain that has been pre-classified or from a particular set of content pages that have been pre-classified. As described above, a "pre-classified content page" or a "pre-classified domain" refers to a page or domain for which a set of pre-classified element identifiers has been generated.

If it is determined at stage 612 that the requested webpage includes pre-classified element identifiers, the server system can communicate a script at stage 616 with the webpage code to the user system according to the determination. The script is executable by a web interface of the user system to modify graphical user interface behavior of the webpage when a user interfaces with any of the page elements of the webpage according to the set of pre-classified element identifiers. The script can be communicated in any suitable way that causes or allows it to be appropriately executed by the user system, including, for example, by communicating the script as a separate response along with the webpage code, injecting or otherwise inserting the script into the webpage code, etc. In some embodiments, a determination is made as to whether additional criteria are present, and the script is only communicated when those criteria are met. For example, the script is only communicated if it is determined that the webpage is an HTML page from one of a set of pre-classified domains.

Embodiments of the script exploit the set of pre-classified element identifiers to modify graphical user interface behavior of the content page when a user interfaces with any of the page elements of the webpage. The set of pre-classified element identifiers can be hard-coded in the script, communicated automatically along with the script, or made accessible in any suitable way. In some implementations, the set of pre-classified element identifiers is stored at the server system and is called by the user system after executing the script.

For example, as described above with reference to FIG. 2, a user's browser issues a first request for a webpage from a content source by opening a connection and issuing one or more "GET" requests. One of the GET requests is for a pre-identified script call. The server system detects the pre-identified script call and issues a redirect response to the user's browser. The redirect response code includes a redirect address and a transaction identifier. When the user's browser receives the redirect response, it opens a new connection to the redirect server and issues a second request with the transaction identifier. When the redirect server receives the second request, it can respond with the script of stage 616. The script of stage 616 can direct the browser to execute a number of tasks, including, for example, executing the pre-identified script call that was part of the first request, executing the additional script content received at stage 616 for modifying graphical user interface behavior of the webpage, and performing any desired message accounting.

Figure 7:
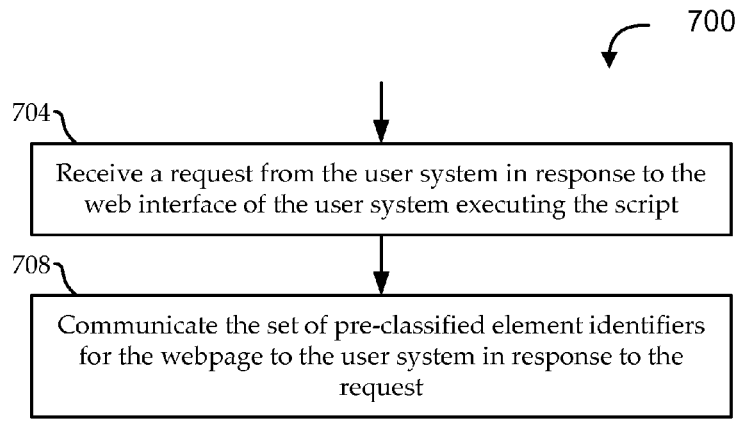
FIG. 7 shows a flow diagram of an illustrative method for communicating the set of pre-classified element identifiers, according to various embodiments.

FIG. 7 shows a flow diagram of an illustrative method 700 for communicating the set of pre-classified element identifiers, according to various embodiments. Having received and executed the script at the user system, the user system issues a request for the set of pre-classified element identifiers. For example, the script executed by the web interface 115 has an "include" or similar command that points to the server-side set of pre-classified element identifiers (e.g., an array stored as "elements.js"). At stage 704, the request is received by the server system. At stage 708, the set of pre-classified element identifiers for the webpage is communicated to the user system in response to the request. For example, the server system communicates Javascript code representing the set of pre-classified element identifiers for that particular webpage, or for one or more content pages, domains, etc. including the webpage or portions of webpages of interest.

Figure 8:
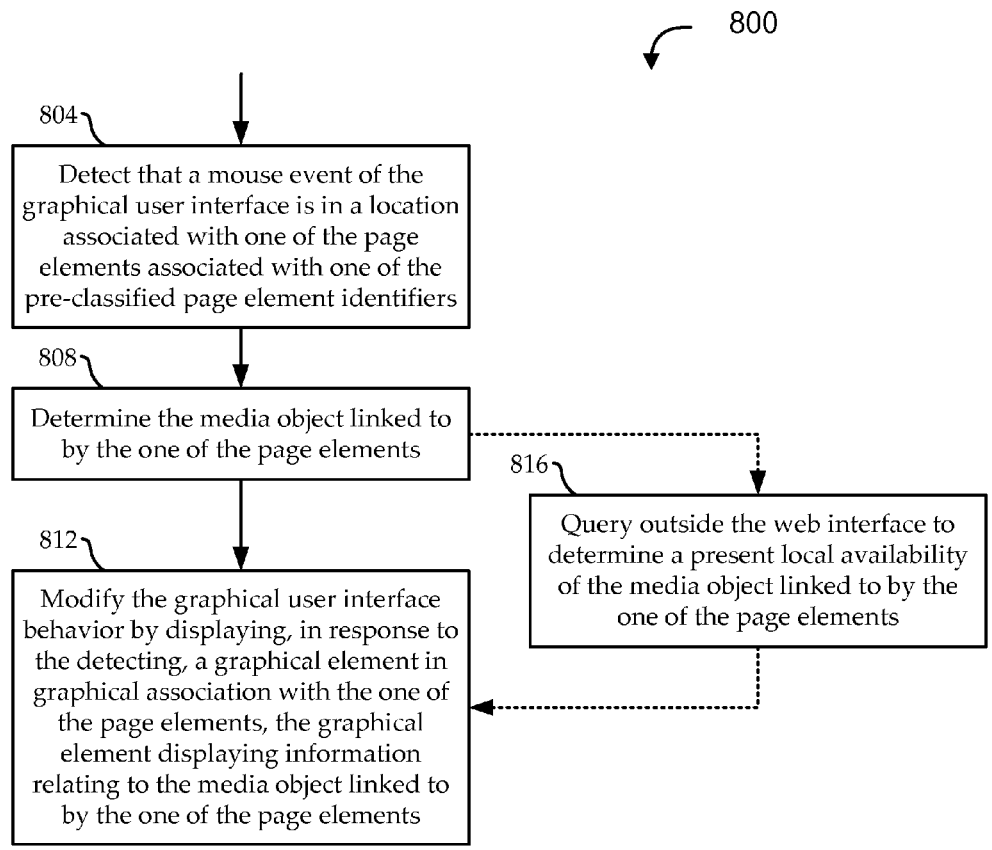
FIG. 8 shows a flow diagram of an illustrative method for responding to user interactions with page elements according to the set of pre-classified element identifiers.

Having executed the script and having provided the script with access to the set of pre-classified element identifiers, the script can be used to modify user interface behavior according to the pre-classified element identifiers for the displayed content page. Turning to FIG. 8, a flow diagram is shown of an illustrative method 800 for responding to user interactions with page elements according to the set of pre-classified element identifiers. Embodiments of the method 800 begin at stage 804 by detecting that a mouse event of the graphical user interface is in a location associated with one of the page elements associated with one of the pre-classified page element identifiers. While embodiments are discussed with reference to a "mouse" event, similar or identical functionality can be performed in context of similar interface events detected from other types of interface devices, including other human interface devices.

A content page may be built in such a way that a particular location is associated with multiple page elements. For example, the page may include a number of objects, each on a separate "<div>" or layer, so that the objects are stacked on top of each other (e.g., having varying levels of associated transparency). Accordingly, detecting that a mouse event of the graphical user interface is in a location associated with one of the page elements associated with one of the pre-classified page element identifiers may involve traversing the set (e.g., stack) of elements at that location to determine if any is associated with one of the pre-classified page element identifiers.

At stage 808, a determination is made of which media object is linked to by the page element that is the subject of the interaction. For example, a webpage has a number of text and/or image links, some of which link to respective media objects of interest to the pre-classification. When a user hovers over one of those links, a first determination is made that the hovered over location corresponds to a link having a pre-classified element identifier, and a second determination of which media object is referenced by the link.

Figure 10:
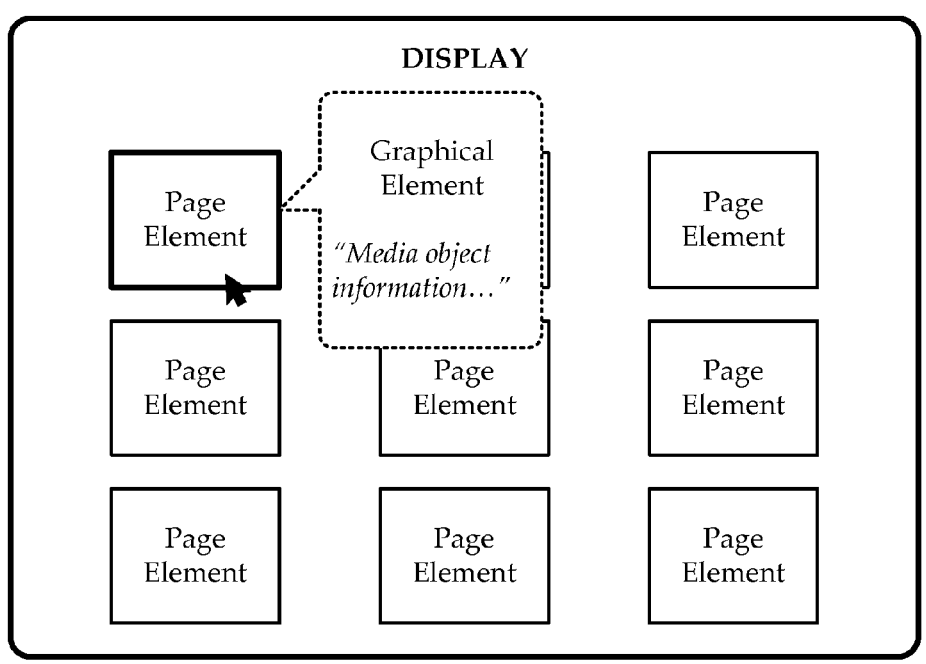
FIG. 10 shows an illustrative user interface having a graphical element displayed in graphical association with a page element and including information relating to a media object linked to by the page element.

In some embodiments, the method 800 proceeds to stage 812, where graphical user interface behavior is modified by displaying, in response to the detecting at stage 804, a graphical element in graphical association with the page element (for example, as illustrated in FIG. 10). The graphical element displays information relating to the media object linked to by the page element. The graphical element can be displayed in any suitable way. For example, in an HTML page, the script can create a "<div>" for the graphical element and associate the "<div>" with a high Z index (e.g., a higher Z index than any Z index associated with the page elements corresponding to the pre-classified element identifiers).

In some embodiments, information displayed in response to detecting interaction with a page element having a pre-classified element identifier is not available from within the platform displaying the GUI (e.g., the web interface). For example, determining whether a requested movie is available and determining an appropriate charge for retrieving the movie may involve determining what content is available locally or from a certain subset of content sources, present network link characteristics, user account information, etc. In some embodiments, prior to (or in conjunction with) displaying the information at stage 812, the method 800 queries outside the web interface to acquire additional information. For example, an API or other call is made to the user modem, the server system, or some other location to determine a present local availability of the media object linked to by the page element.

Figure 9:
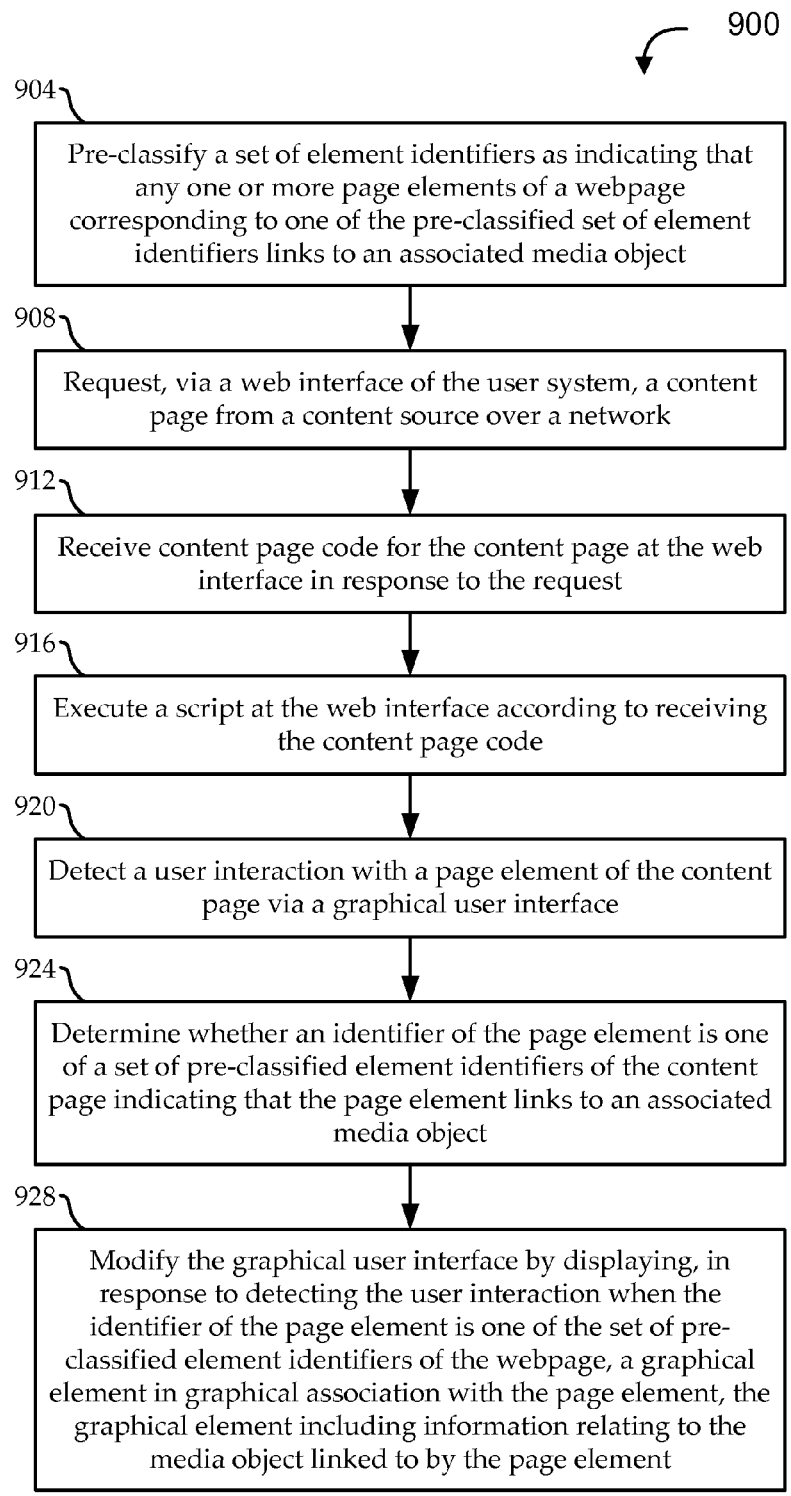
FIG. 9 shows a flow diagram of another illustrative method for modifying graphical user interface behavior according to element identifier pre-classification, according to various embodiments.

FIG. 9 shows a flow diagram of another illustrative method 900 for modifying graphical user interface behavior according to element identifier pre-classification, according to various embodiments. Embodiments of the method 900 begin at stage 904 by pre-classifying a set of element identifiers as indicating that any one or more page elements of a webpage corresponding to one of the pre-classified set of element identifiers links to an associated media object. The pre-classifying at stage 904 may be performed in a similar or identical manner to the pre-classifying at stage 604 described with reference to FIG. 6.

At stage 908, a content page (e.g., a webpage) is requested via a web interface of a user system from a content source over a network. Content page code for the content page is received at the web interface at stage 912 in response to the request made at stage 908. At stage 916, a script is executed at the web interface according to receiving the content page code. The script can be executed in various ways. In some implementations, the script is received along with the content page code and is executed thereafter. In other implementations, the script is executed by a plug-in or other client-side application in response to receiving the content page code.

As described above, executing the script causes the web interface to provide certain functionality to the user. For example, at stage 920, a user interaction is detected with a page element of the content page via a GUI of the web interface. In response to detecting the user interaction, at stage 924, a determination is made as to whether an identifier of the page element is one of the set of pre-classified element identifiers of the content page indicating that the page element links to an associated media object. If so, at stage 928, the GUI is modified by displaying a graphical element in graphical association with the page element (for example, as illustrated in FIG. 10). The graphical element includes information relating to the media object linked to by the page element.

The methods disclosed herein comprise one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means, including embodiments of user system 110 and/or server system 140 components, can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for modifying graphical user interface behavior according to element pre-classification, the method comprising:

fetching and analyzing content page code for a content page to determine which page elements within the content page code link to an associated media object;

generating a set of pre-classified element identifiers for the page elements by pre-classifying the page elements that link to the associated media object;

requesting, via a web interface of the user system, the content page from a content server over a network;

receiving the content page code for the content page at the web interface in response to the requesting step;

determining that the content page is associated with the set of pre-classified element identifiers;

requesting the set of pre-classified element identifiers in response to determining that the content page is associated with the set of pre-classified element identifiers;

receiving the set of pre-classified element identifiers in response to the request for the set of pre-classified element identifiers; and executing a script at the web interface, so that detecting a user interaction with a page element of the content page via a graphical user interface causes the web interface to:

determine whether an identifier of the interacted page element is one of the set of pre-classified element identifiers of the content page indicating that the interacted page element links to an associated media object at a network location separate from the content page; and modify the graphical user interface by displaying, in response to detecting the user interaction when the identifier of the interacted page element is one of the set of pre-classified element identifiers of the webpage, a graphical element in graphical association with the interacted page element, the graphical element including information relating to the media object linked to by the interacted page element.

2. The method of claim 1, further comprising:
receiving the script along with the content page code at the web interface in response to the requesting step.

3. The method of claim 1, further comprising:
detecting, by the user system, the request from the web interface for the content page from the content source; and issuing, by the user system, a redirect response to the web interface that causes the web interface to issue a second request to a redirect address, wherein the script is communicated to the user system from the redirect address in response to the second request.

4. The method of claim 1, wherein the executing step is performed in response to the receiving step.

5. The method of claim 1, wherein the identifier of the page element is an object class or ID.

6. The method of claim 1, wherein the web interface is a web browser, and the script is executed by a plug-in of the web browser.

7. The method of claim 1, wherein detecting the user interaction with the page element comprises detecting a mouse event in a location associated with one of the set of page elements.

8. The method of claim 1, wherein the content page is a webpage or a client application page.

9. A user system in communication with a plurality of content servers via a communications network, the system comprising:
- a web interface; and
- a client optimizer in communication with the web interface and comprising a processor operable to:
  - fetch and analyze content page code for a content page to determine which page elements within the content page code link to an associated media object;
  - generate a set of pre-classified element identifiers for the page elements by pre-classifying the page elements that link to the associated media object;
  - request, via the web interface, the content page from one of the content servers over the communications network;
  - receive the content page code for the content page at the web interface in response to the request;
  - determine that the content page is associated with one of a set of pre-classified domains;
  - request the set of pre-classified element identifiers from the web interface via the network in response to determining that the content page is associated with one of the set of pre-classified domains;
  - receive the set of pre-classified element identifiers via the network in response to the request for the set of pre-classified element identifiers; and
  - execute a script at the web interface, thereby configuring the web interface so that detecting a user interaction with a page element in the retrieved content page via a graphical user interface causes the web interface to:
  - determine whether an identifier of the interacted page element is one of the set of pre-classified element identifiers of the content page indicating that the interacted page element links to an associated media object at a network location separate from the retrieved content page; and
  - modify the graphical user interface by displaying, in response to detecting the user interaction when the identifier of the interacted page element is one of the set of pre-classified element identifiers of the webpage, a graphical element in graphical association with the interacted page element, the graphical element including information relating to the media object linked to by the interacted page element.

10. The user system of claim 9, wherein executing the script renders the client optimizer operable via the web interface to:
- detect that a mouse event of the graphical user interface is in a location associated with one of the page elements associated with one of the pre-classified page element identifiers; and
- modify the graphical user interface behavior by displaying, in response to the detecting, a graphical element in graphical association with the one of the page elements, the graphical element displaying information relating to the media object linked to by the one of the page elements.

11. The user system of claim 9, wherein executing the script renders the client optimizer operable via the web interface to:
- detect that a mouse event of the graphical user interface is in a location associated with one of the page elements associated with one of the pre-classified page element identifiers;
- determine the media object linked to by the one of the page elements; and
- query outside the web interface to determine a present local availability of the media object linked to by the one of the page elements.

* * * * *